(12) United States Patent
Sharma et al.

(10) Patent No.: US 12,651,145 B2
(45) Date of Patent: Jun. 9, 2026

(54) DATA DRIVEN APPROACHES TO IMPROVE UNDERSTANDING OF PROCESS-BASED MODELS AND DECISION MAKING

(71) Applicant: MICROSOFT TECHNOLOGY LICENSING, LLC, Redmond, WA (US)

(72) Inventors: Swati Sharma, Hayward, CA (US); Somya Sharma, Minneapolis, MN (US); Emre Mehmet Kiciman, Seattle, WA (US); Ranveer Chandra, Kirkland, WA (US); Sara Malvar, Sao Paulo (BR); Eduardo Rocha Rodrigues, Sao Paulo (BR)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 661 days.

(21) Appl. No.: 18/163,156

(22) Filed: Feb. 1, 2023

(65) Prior Publication Data

US 2024/0046073 A1     Feb. 8, 2024

Related U.S. Application Data

(60) Provisional application No. 63/394,946, filed on Aug. 3, 2022.

(51) Int. Cl.
*G06N 3/0455* (2023.01)
*G06N 7/01* (2023.01)

(52) U.S. Cl.
CPC ............. *G06N 3/0455* (2023.01); *G06N 7/01* (2023.01)

(58) Field of Classification Search
CPC ........ G06N 3/0455; G06N 7/01; G06N 3/048; G06N 3/09; G06N 5/025; G06N 3/042; G01N 33/24
See application file for complete search history.

(56) References Cited

U.S. PATENT DOCUMENTS

2022/0061236 A1* 3/2022 Guan ...................... A01G 7/00

OTHER PUBLICATIONS

Feng, Qianyu, Bang Zhang, and Yi Yang. "Divide and Rule: Recurrent Partitioned Network for Dynamic Processes." arXiv preprint arXiv:2106.00258 (2021). (Year: 2021).*

(Continued)

*Primary Examiner* — Michael H Hoang
(74) *Attorney, Agent, or Firm* — Benjamin Keim; Newport IP, LLC

(57) ABSTRACT

This disclosure provides a data-driven and scalable method to discover cause-and-effect relationships in data from natural systems that include sparse data sets. This technique can learn a causal graph from heterogenous data sources by combining embeddings from real data and embeddings from simulated data generated by process-based models. The causal graph is used for what-if analysis in out-of-distribution settings. One application is understanding the factors that affect soil carbon. A causal model created by these techniques can be used to discover cause-and-effect relationships that affect soil carbon. This model has applications such as forecasting soil carbon for a future time point to help inform farm practices. Farm practices, like tilling, may be modified in response to predictions provided by the model.

20 Claims, 6 Drawing Sheets

200

(56) References Cited

OTHER PUBLICATIONS

Nguyen, Thu Thuy. "Predicting agricultural soil carbon using machine learning." Nature Reviews Earth & Environment 2.12 (2021): 825-825. https://www.nature.com/articles/s43017-021-00243-y (Year: 2021).*

Fan, et al., "A GNN-RNN Approach for Harnessing Geospatial and Temporal Information: Application to Crop Yield Prediction", In Repository of arXiv:2111.08900v2, Jan. 21, 2022, 14 Pages.

Minu, et al., "Prediction Accuracy of Soil Organic Carbon from Ground Based Visible Near-Infrared Reflectance Spectroscopy", In Journal of the Indian Society of Remote Sensing vol. 46, Jan. 5, 2018, pp. 697-703.

"International Search Report and Written Opinion Issued in PCT Application No. PCT/US23/027453", Mailed Date: Oct. 6, 2023, 21 Pages.

Yu, et al., "DAG-GNN: DAG Structure Learning with Graph Neural Networks", In Repository of arXiv:1904.10098v1, Apr. 22, 2019, 12 Pages.

"APSIM: The Leading Software Framework for Agricultural Systems Modelling and Simulation", Retrieved from: https://www.apsim.info/, Jul. 13, 2022, 8 Pages.

Batjes, et al., "WoSIS: Providing Standardised Soil Profile Data for the World", In Journal of Earth System Science Data, vol. 9, Issue 1, Jan. 17, 2017, 14 Pages.

Emmett, et al., "Countryside Survey: Soils Report from 2007", Published in CS Technical Report No. 9/07, Jan. 2010, 194 Pages.

Feeney, et al., "Multiple Soil Map Comparison Highlights Challenges for Predicting Topsoil Organic Carbon Concentration at National Scale", In Journal of Scientific Reports, vol. 12, Issue 1, Jan. 26, 2022, 13 Pages.

Gilmer, et al., "Neural Message Passing for Quantum Chemistry", In Proceedings of the 34th International Conference on Machine Learning, Aug. 6, 2017, 10 Pages.

Johnston, et al., "Soil Organic Matter: Its Importance in Sustainable Agriculture and Carbon Dioxide Fluxes", In Journal of Advances in Agronomy, vol. 101, Jan. 1, 2009, 57 Pages.

Keating, et al., "An Overview of APSIM, A Model Designed for Farming Systems Simulation", In European Journal of Agronomy, vol. 18, Issue 3-4, Jan. 2003, pp. 267-288.

Lal, et al., "Managing Soil Carbon", In Journal of Science, vol. 304, Issue 5669, Apr. 16, 2004, pp. 393-393.

Morales-Alvarez, et al., "VICause: Simultaneous Missing Value Imputation and Causal Discovery with Groups", In Repository of arXiv:2110.08223v1, Oct. 15, 2021, 19 Pages.

Li, Changsheng, "The DNDC Model", Published in Book Evaluation of Soil Organic Matter Models, 1996, pp. 263-267.

Metherell, et al., "CENTURY Soil Organic Matter Model Environment", In Technical Documentation, Agroecosystem Version 4.0, 1993, 88 Pages.

Metherell, Alister K. , "Simulation of Soil Organic Matter Dynamics and Nutrient Cycling in Agroecosystems", A Dissertation submitted In Partial Fulfillment of the Requirements for the Degree of Doctor of Philosophy, Colorado State University, Fort Collins, Colorado, Oct. 22, 1992, 22 Pages.

"Status of the World's Soil Resources (SWSR)—Main Report", In Main Report of Food and Agriculture Organization of the United Nations, 2015, 650 Pages.

Parton, et al., "DAYCENT and its Land Surface Submodel: Description and Testing", In Journal of Global and Planetary Change, vol. 19, Issue 1-4, Dec. 1998, pp. 35-48.

Peri, et al., "Soil Carbon is a useful Surrogate for Conservation Planning in Developing Nations", In Journal of Scientific Reports, vol. 9, Issue 1, Mar. 7, 2019, 6 Pages.

Blanco-Canqui, et al., "Soil Organic Carbon: The Value to Soil Properties", In Journal of Soil and Water Conservation, vol. 68, Issue 5, Sep. 2013, pp. 129A-134A.

Skjemstad, et al., "Calibration of the Rothamsted Organic Carbon turnover Model (RothC ver. 26.3), using Measurable Soil Organic Carbon Pools", In Australian Journal of Soil Research, vol. 42, Issue 1, Feb. 16, 2004, pp. 79-88.

Toth, et al., "LUCAS Topoil Survey—Methodology, Data and Results", JRC Technical Reports published in Office of the European Union, Aug. 27, 2013, 154 Pages.

Fan, et al., "A GNN-RNN Approach for Harnessing Geospatial and Temporal Information: Application to Crop Yield Prediction", arXiv:2111.08900v2, Jan. 21, 2022, 14 Pages.

International Search Report and Written Opinion received for PCT Application No. PCT/US23/027453, Jun. 10, 2023, 19 pages.

Minu, et al., "Prediction Accuracy of Soil Organic Carbon from Ground Based Visible Near-Infrared Reflectance Spectroscopy", Journal of the Indian Society of Remote Sensing, vol. 46, Issue No. 05, Jan. 5, 2018, pp. 697-703.

Yu, et al., "DAG-GNN: DAG Structure Learning with Graph Neural Networks", arXiv:1904.10098v1, Apr. 22, 2019, 12 Pages.

* cited by examiner

OBTAIN REAL DATA 402

GENERATE SIMULATED DATA 404

LEARN A HIDDEN EMBEDDING OF THE REAL DATA 406

LEARN A HIDDEN EMBEDDING OF THE SIMULATED DATA 408

LEARN A CAUSAL GRAPH FROM THE HIDDEN EMBEDDINGS OF THE REAL DATA AND THE SIMULATED DATA 410

GENERATE A PREDICTED VALUE FROM THE CAUSAL GRAPH 412

DATA DRIVEN APPROACHES TO IMPROVE UNDERSTANDING OF PROCESS-BASED MODELS AND DECISION MAKING

PRIORITY APPLICATION

This application claims the benefit of and priority to Provisional Application No. 63/394,946, filed Aug. 3, 2022, the entire contents of which are incorporated herein by reference.

BACKGROUND

Soil carbon is not only important for soil health but also has co-benefits such as improving water storage capacity. Increased levels of soil carbon aid conservation efforts to minimize loss in biodiversity and make soil and ecosystems more resistant to climatic events such as droughts and rainstorms. Monitoring soil carbon levels is also important to ensure proper nutrients for microorganisms and fauna. However, yield-production-driven farming practices like plowing and tilling have led to the loss of 78 gigatons of soil carbon around the world. The loss of soil carbon caused by field management practices not only makes fields less fertile but also has other negative effects such as increased erosion, biomass loss, and increased carbon-based emissions. There is a need for a greater understanding of how agricultural processes and bio-geochemical soil processes affect soil carbon levels.

Many process-based models are used to study changes in soil carbon. These models simulate factors like weather drivers, change in land use, soil texture, and macro-nutrient information. Process-based models represent one or more processes using differential equations and/or empirical knowledge. Examples of process-based models include DeNitrification-DeComposition (DNDC), the Rothamsted carbon model (RothC), and Agricultural Production Systems sIMulator (APSIM). Process-based models are complex, they need calibrated input parameters, access to all input parameters, and are built from specific assumptions and constraints which typically require the assistance of a domain expert.

Improved modeling techniques are needed for understanding how changes in weather and field management practices can affect soil carbon. This disclosure is made with respect to these and other considerations.

SUMMARY

This disclosure provides a data-driven and scalable method to discover cause-and-effect relationships to improve understanding of process-based models and decision-making based on such models. The methods and techniques of this disclosure can be used to improve the modeling of biological and natural systems including, but not limited to, soil carbon. One aspect of this method is the ability to learn a causal graph from heterogeneous data—real data and simulated data. The real data is collected from direct observation such as from sensors in the environment. Simulated data is generated from one or more process-based models. In some implementations, specific processes (e.g., soil processes) may be included in only one of the datasets. The causal graph can improve what-if analysis in out-of-distribution settings (e.g., forecasting soil carbon for a future time point to help inform farm practices or predicting how a change in tilling practices may impact soil carbon).

The causal discovery used to automatically create a causal graph identifies cause-and-effect relationships between different processes and variables as well as the strength of those relationships. The advantage of this approach is that even if the process-based model is not calibrated perfectly, inclusion of real data enables the modeling process to reveal the true relationships between different features. This may be applied to many domains in which process-based models exist and the real data is sparse. By combining simulated data from process-based models and real data using causal discovery approaches, the techniques of this disclosure can discover cause-and-effect relationships rather than spurious correlations valid only for specific data sets. Modeling based on causal relationships, rather than just correlations, increases confidence in predictions and counterfactual analysis.

As compared to other conventional machine learning methods that rely on learning potentially spurious correlations among variables, the techniques of this disclosure extract the underlying cause-and-effect relation among different processes from both real and simulated data. This method enables automatic learning of the underlying interdependence of multiple processes from process-based models and serves to adapt machine learning to specific scenarios based on the real data. Thus, because the techniques of this disclosure are fully data driven, they can be implemented automatically without the need for a subject-matter expert.

One application for the techniques provided in this disclosure is modeling soil carbon. The real data used for modeling soil carbon levels is generally sparse. Creating a data set to measure soil carbon requires expensive and time-consuming soil survey sampling. Simulated data created by process-based models are used to supplement the real data. Machine learning with these techniques is then able to learn a causal graph that jointly considers independent processes identified from both real data and simulated data. Unlike rigid linear models, these methods can be easily generalized to new use cases (e.g., different fields, biomes, crop growth, and/or field management practices). The causal graph learned from modeling of real data and simulated data can be used to improve spatiotemporal modeling, forecasting, and what-if analysis. Farmers can then modify field management practices accordingly to increase soil carbon or to minimize depletion of soil carbon.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 1 is a schematic diagram showing techniques for learning a causal graph from heterogeneous data sets and applying the causal graph to predict values from what-if scenarios.

FIG. 3 is a diagram of an illustrative causal graph.

DETAILED DESCRIPTION

Figure 1:
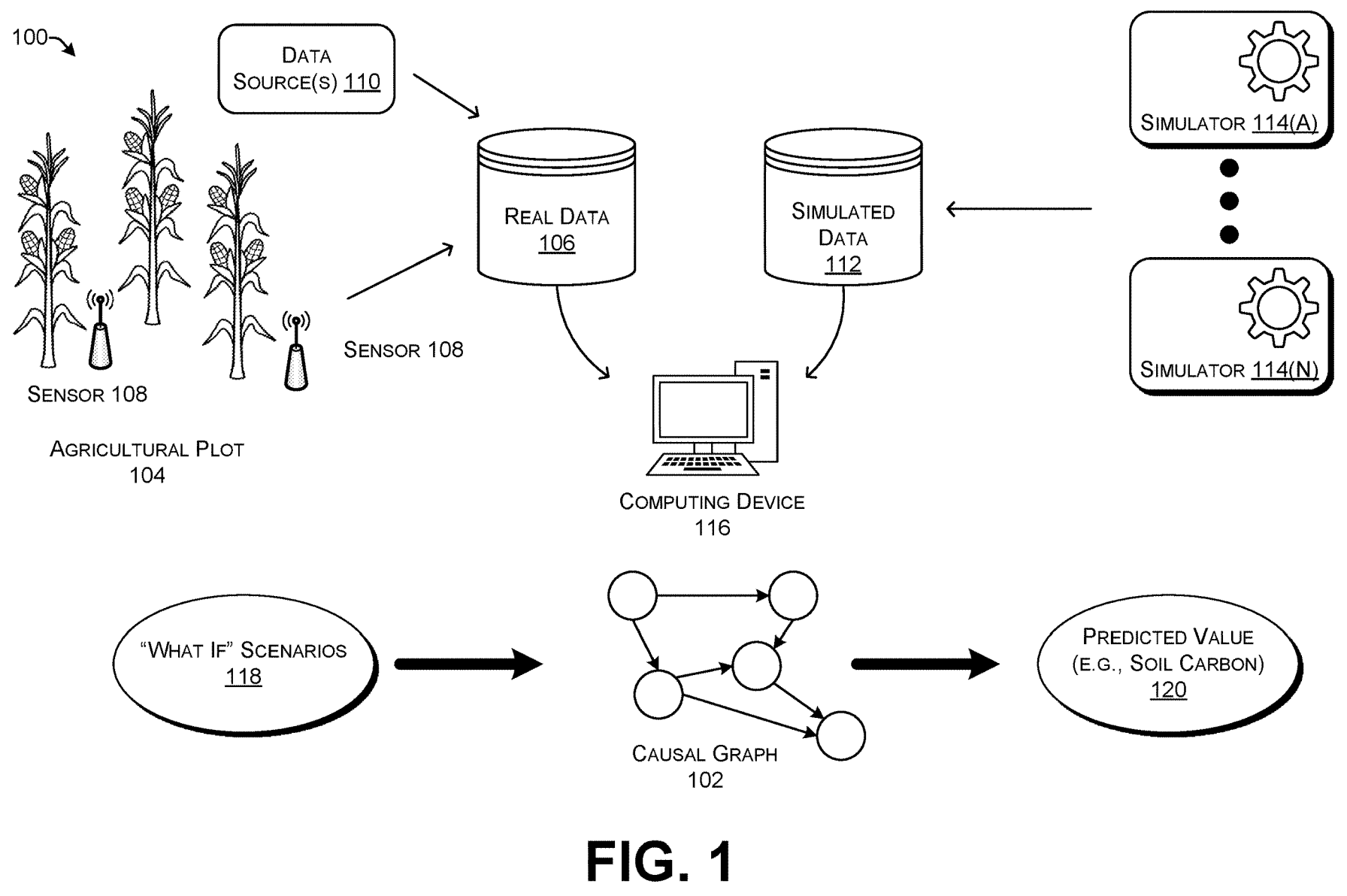
Figure 2:
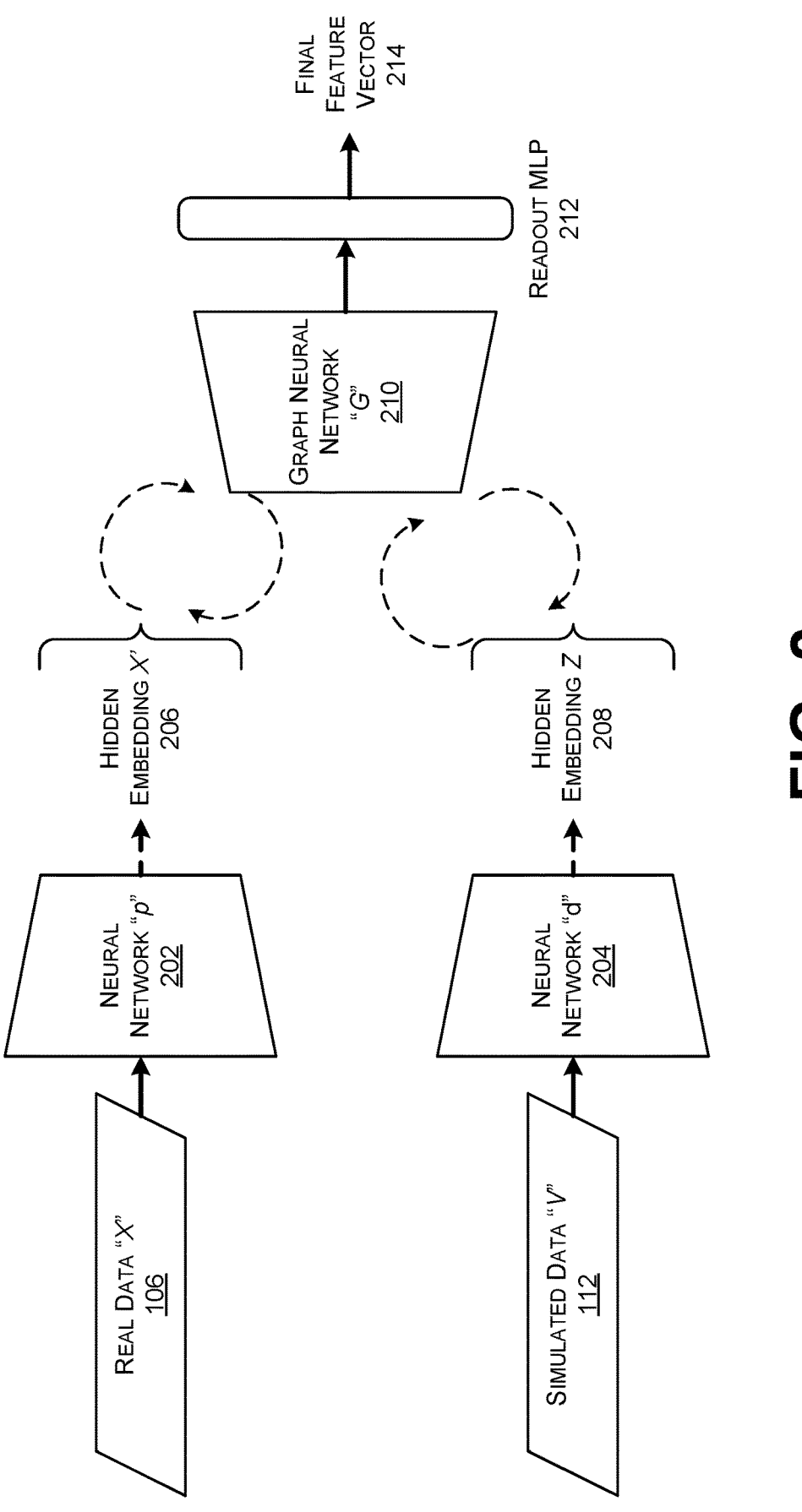
FIG. 2 is a schematic diagram showing a framework for learning a graph neural network from heterogeneous data-sets.

FIG. 1 is a schematic diagram 100 showing creation of a causal graph 102 from heterogeneous datasets. In this illustrative scenario, the causal graph 102 is used to predict future levels of soil carbon in an agricultural plot 104. The agricultural plot 104 is land on which a crop or other plants may grow. However, the techniques of this disclosure are equally applicable to land that is not actively managed for agriculture as well as for land that is fallow without a crop.

Soil carbon is important for soil health. Recent research suggests the existence of short-term variations in soil carbon. However, it would be prohibitively expensive and time-consuming to frequently measure soil carbon with soil survey sampling on a large scale. The techniques of this disclosure are useful for studying short-term soil carbon changes with data-driven estimation instead to multiple soil carbon measurements.

Measured or observed data that describes conditions which affect soil carbon is collected from multiple sources. This is referred to as real data 106. The real data 106 may come from one or more sensors 108 placed in or around the agricultural plot. The sensors 108 may detect things such as soil moisture, soil temperature, soil pH, air temperature, wind velocity, greenhouse gasses, and solar radiation. One or more data sources 110 other than sensors may also be used to obtain the real data 106. The other data sources 110 included results from laboratory analysis such as analysis of soil to determine such things as sand content, clay content, soil organic matter, pH, and the amounts of minerals present. Data sources 110 that contain data for conditions at the agricultural plot 104 but that were not directly measured at the agricultural plot 104 such as weather data may also be included. Data from any or all of these sources are used to create a dataset that contains the real data 106 for the agricultural plot 104.

Another data source 110 for the real data 106 is reports of field management practices stored as field management practice data. Field management practices are any manipulation or treatment that a farmer (or another person) can perform on the agricultural plot 104. Events such as spreading manure, applying fertilizer, mowing, applying pesticide, picking up silage, etc., are field management practices that can be added to the real data 106. The field management practices that are represented in the field management practice data are those practices that have been applied to the agricultural plot 104 or practices that are being considered as a "what-if" scenario.

One challenge is that the real data may be sparse or have missing data. Some types of measurements may be entirely absent for a given agricultural plot 104. Other data may be collected only intermittently, and current data may be unavailable. However, the real data 106 is accurate and specific to the agricultural plot 104.

The techniques of this disclosure supplement or combine the real data 106 with simulated data 112. The simulated data 112 is generated by one or more simulators 114(A)-114(N). A simulator 114 is a process-based model that predicts values for features related to the process being modeled. If the process is accumulation of soil carbon, then the simulator(s) 114 are process-based models of soil processes. The simulator(s) 114 may be a linear model, a machine learning model, or another type of model. Multiple different types of simulators 114(A)-114(N) may be used and results from more than one of the simulators 114(A)-114(N) may be combined to create the simulated data 112. Input parameters to simulator(s) 114 for soil carbon may include, but are not limited to, field management practices, climate, soil initial condition, and crop information. Any of the parameters that may be included in real data 106 may also be included in the simulated data 112 and vice versa.

Although a simulator 114 can readily produce data, the underlying process models may not be entirely accurate, the models can be difficult to calibrate, and they may not model all relevant processes. The process models used as simulators 114 may not be fully valid and if relied on alone may provide inaccurate predictions. While simulated data 112 is abundant and easy to obtain, accuracy may be low and it may not be localized to the agricultural plot 104.

The simulator(s) 114 generate the simulated data 112 for the same agricultural plot 104 from which the real data 106 was collected. Thus, both the real data 106 and the simulated data 112 represent the same physical location. They are spatially correlated. In some implementations, the simulated data 112 is generated by providing some or all the real data 106 as input to the simulator(s) 114. However, inputs other than the real data 106 may also be used with the simulator(s) 114.

The simulated data 112 offers insights into the underlying relations encoded in the process-based models of the simulator(s) 114. The use of locally-collected real data 106 improves region-specific insights and helps mitigate the impact of any biased assumptions or hypotheses from the simulator(s) 114. Some types of data may be found in only one of the datasets. There is no requirement for full overlap of data types between the real data 106 and the simulated data 112. For example, soil temperature at 30 cm depth may be available only in the simulated data 112. Similarly, a certain field management practice such as applying a new type of fertilizer may not be included in any of the simulator(s) 114 so that data would come only from the real data 106.

Both the real data 106 and the simulated data 112 may be available in part as a time series. For example, meteorological data and field management practices may be time series data. The data sets are multi-scale and data is observed at different cadences and over different time frames. The intervals of the time series may be different for different types of data. Example intervals or periods between data points in a time series could be 15 minutes, 30 minutes, one hour, one day, one week, one month, one year, three years, 10 years, or another interval. Individual points in the time series from the real data 106 and simulated data 112 may be aligned so that the two data sets are temporarily correlated. For example, measurements obtained on the 100$^{th}$ day of a growing season contained in the real data 106 may be combined in a single time point with simulated data 112 generated for that same day of the growing season.

A computing device 116 receives a heterogenous dataset containing the real data 106 and the simulated data 112 and learns a causal graph 102 from the heterogeneous data set. Although this example describes soil carbon, the computing device 116 may be used to learn a causal graph for any process if there is a dataset containing real data 106 and simulated data 112. The computing device 116 may be any type of conventional computing device including a plurality of physically separate computing devices such as a network-accessible or cloud-based computing device. In some implementations, the computing device 116 is the same computing device that operates the simulator(s) 114 and generates the simulated data 112. In some implementations, the simulator(s) 114 are maintained on a different computing device (not shown).

Learning the causal graph 102 discovers relationships between features and processes. This is different from discovering mere mathematical correlations that may or may not reflect actual causal relationships. In brief, encodings are learned for the real data 106 and for the simulated data 112, the causal graph 102 is learned based on the encodings, and the learned graph is decoded. Causal graphs (also known as path diagrams, causal Bayesian networks, or direct acyclic graphs) are probabilistic graphical models used to encode assumptions about the data-generating process.

When modeling soil carbon, the causal graph 102 shows causal relationships between factors that affect soil carbon levels. Learning the causal graph 102 identifies those causal relationships and the strength of those relationships. The causal graph 102 is learned from the real data 106 of the agricultural plot 104 so the causal graph 102 is specific to the agricultural plot 104.

One use of the causal graph 102 is to improve modeling. These techniques can be used to develop an inverse model to estimate input parameters for the simulator(s) 114 from local data. Generating the causal graph 102 includes determining distributions of parameters that are not well documented. These parameter distributions may be used to improve the process models of the simulator(s) 114 by suggesting a better local model for the agricultural plot 104.

The causal graph 102 can also be used to compare "what if" scenarios 118 to see how different field management practices or different weather may affect a predicted valued 120 (e.g., predicting soil carbon levels). For example, soil carbon can be modeled with different amounts of tilling to see how much increased tilling decreases soil carbon. Similarly, different fertilizers can be compared to see which would increase soil carbon the most. Multiple different field management practices could be compared and one could be recommended for the agricultural plot 104 based on their effects on soil carbon. Changes to the predicted value 120 under different "what if" scenarios 118 may be quantified to identify how much soil carbon is predicted to change in response to a quantitative change in an input.

FIG. 2 illustrates a framework 200 for learning a graph neural network 210 from both real data 106 and simulated data 112. The technique represented by framework 200 may be referred to as Knowledge-guided Representation Learning and Causal Learning (KGRCL).

This framework utilizes two sources of data: real data 106 ("X") and simulated data 112 ("V"). Any one sample ([X$_k$, V$_k$]) from these datasets represents a shared timepoint (e.g., values for the same day). Therefore, the simulated data 112 and real data 106 are temporally aligned for model training by time-based indexing of samples. However, this is not time-series modeling because this framework 200 does not rely on learning from past time steps. Each sample [X$_k$, V$_k$] is comprised of several processes (e.g., soil processes) readings such that X$_k$=[x$_{1,k}$, x$_{2,k}$, ..., x$_{d,k}$] (at k$^{th}$ time point, real data 106 has measurements of d processes) and V$_k$=[v$_{1,k}$, v$_{2,k}$, ..., v$_{p,k}$] (also at k$^{th}$ time point, simulated data 112 contains values for p processes). The processes are distinct variables in the real data 106 and the simulated data 112. Some or all of these processes may be common between the real data 106 and the simulated data 112. However, there may also be one or more processes that are not common and included in only the real data 106 or only the simulated data 112.

To overcome the limitations of process-based models, this framework 200 approximates the causal relation among processes by utilizing both simulated data 112 and real data 106. The graph learning is based on the VISL (Value Imputation and Structure Learning) framework described in Morales-Alvarez, P. et al. *Vicause: Simultaneous missing value imputation and causal discovery with groups*. arXiv preprint arXiv:2110.08223 (2021). VISL is a scalable structure learning approach that can simultaneously infer structures between groups of variables under missing data and perform missing value imputations with deep learning. VISL provides an approach to simultaneously tackle group-wise structure learning and missing value imputations driven by real-world topic relationship discovery. This is accomplished by combining variational inference with a generative model that leverages a structured latent space and a decoder based on message-passing Graph Neural Networks (GNN) (Gilmer, J., Schoenholz, S. S., Riley, P. F., Vinyals, O. & Dahl, G. E. *Neural message passing for quantum chemistry*. In International conference on machine learning, 1263-1272 (PMLR, 2017)). Namely, the structured latent space endows each group of variables with its latent subspace, and the interactions between the subspaces are regulated by a GNN 210 whose behavior depends on the inferred graph from variational inference. VISL is a variational auto-encoder based framework. Observations from each group are encoded into low dimensional latent variables as hidden embedding X' 206 and hidden embedding Z 208. The structure is treated as a global latent variable. A GNN-based decoder, GNN 210, is used to decode the latent variables to observations.

When modeling soil dependencies, each variable in the data represents a different physical process with a different data distribution therefore, naively grouping variables is not pragmatic. This framework 200 learns from two heterogeneous sources of data (i.e., the real data 106 and the simulated data 112), where sharing information helps enrich a causal graph of soil processes. Representations for the real data X 106 and simulated data V 112 are learned using a neural network "p" 202 and a neural network "d" 204. Both neural networks 202, 204 are trained as part of creating the model resulting in trained neural networks. In an implementation, neural networks 202, 204 are implemented as multilayer perceptrons (MLP). A MLP is a fully connected class of feedforward artificial neural network (ANN) that includes an input layer, a hidden layer, and an output layer. Except for the input nodes, each node is a neuron that uses a nonlinear activation function.

For the real data "X" 106, a hidden embedding X' 206 is learned by a neural network "p" 202. The hidden embedding X' 206 is a deterministic encoded representation. For simulated data "V", a hidden embedding Z 208 is learned from a neural network "d" 204. Each hidden embedding represents a data distribution for the variables X' and Z. A data distribution is a function that specifies all possible values for a variable and also quantifies the relative frequency (probability of how often the values occur).

Distributional parameters $\mu$ (mean) and $\sigma$ (standard deviation) are learned for each of the d features in V. Using the neural network "d" 204, this information is passed into a graph neural network ("G") 210. This GNN 210 helps in learning the relation among the "p" variables based on the distribution of related latent variables, Z, from the simulated data "V" 112. The hidden embedding X' 206 and the hidden embedding Z 208 are updated using feedback from the GNN 210.

This is a type of message passing neural network (MPNN). In message passing, the node embeddings in the GNN 210 are updated in t message passing (or node-to-message/n2m) and node encoding update (or message-to-node/m2n) operations where t represents an iteration number. These operations at $t^{th}$ iteration, would be, $$n2m: h_{i \to j}^{(t),f} = MLP^f\left(x_i'^{(t-1)}, x_j'^{(t-1)}, z_i^{(t-1)}, z_j^{(t-1)}\right) \text{ and} \tag{1}$$

$$m2n: x_i'^{(t)} = MLP^{m2n}\left(\sum_{q \ne i} G_{qi} h_{q \to i}^{(t)f}\right) \tag{2}$$

In the n2m update, the message is aggregated from neighboring nodes. A message going from node i to node j at the $t^{th}$ message passing iteration, can be transformed using the non-linear mapping that $MLP^f$ provides. The hidden encoding X' at $t^{th}$ iteration is obtained in the m2n operation, where $MLP^{m2n}$ provides an update using the graph neural network 210 and hidden node representation h. The message aggregation relies on hidden embedding Z 208 and hidden embedding X' 206 obtained from the two sources of data (i.e., the real data 106 and the simulated data 112). The updated hidden embedding X' 206 is passed through the graph neural network 210 and a readout MLP 212 to create a final feature vector $\hat{X}$ 214.

In each epoch/iteration, all samples are processed one by one to update the hidden embeddings X' 206 and Z 208 and the causal graph represented by the GNN 210. Therefore, for the $k^{th}$ sample/time-step, equations 1 and 2 will look like this:

$$n2m_k: h_{i_k \to j_k}^{(t),f} = MLP^f\left(x_{i_k}'^{(t-1)}, x_{j_k}'^{(t-1)}, z_{i_k}^{(t-1)}, z_{j_k}^{(t-1)}\right) \text{ and} \tag{3}$$

$$m2n_k: x_{i_k}'^{(t)} = MLP^{m2n}\left(\sum_{q \ne i} G_{q_k i_k} h_{q_k \to i_k}^{(t)f}\right) \tag{4}$$

Equation 4 represents the causal graph. The causal graph is learned from the real data 106 with influence by the data distribution of the simulated data 112. Equation 4 maximizes the probability of observing X. The readout MLP 212 denoted as "R" can be represented as, $$\hat{X} = R\left(\{x_i^T | i \in G\}\right) \tag{5}$$

This forces a graph structure that is directed and acyclic. The readout MLP 212 is a readout layer that converts a graph embedding from the GNN 210 to a reconstructed representation $\hat{X}$ as described in Gilmer, J, et al.

In the n2m operation, $\mu$ and $\sigma$ parameters learned for the hidden embeddings in Z can be used to transform the matching X' features distribution as $$Z' = \frac{X' - \mu_Z}{\sigma_Z}.$$

This transformed Z' feature set can be used for the overlapping features between X and V. The framework 200 learns a directed acyclic graph (DAG), the GNN 210, that fits well to the real data "X" 106, $$\arg \max\nolimits_{X, G \in \mathscr{G}} p(X|G,Z)p(G) \tag{6}$$

where $\mathscr{G}$ is the hypothesis class comprising all DAGs that can be created from the GNN 210. An explicit regularization term, $\lambda \mathcal{R}$, can be added to incorporate the DAG constraint in the objective, $$\arg \max\nolimits_{X, G \in \mathscr{G}} (p(X|G,Z)p(G|Z) - \lambda \mathcal{R}(G|Z,X')) \tag{7}$$

The DAG regularization can be removed depending on whether a DAG graph is desired or not. The ELBO objective will be of the form:

$$ELBO = \sum_n \left\{ \mathbb{E}_{q_\phi(Z_n|V_n)q(G)}[\log p(V_n \mid Z_n, G)] - KL(q_\phi(Z_n \mid V_n)\|p(Z_n))] + \right. \tag{8}$$
$$\mathbb{E}_{q_\phi(X_n'|X_n)q(G)}[\log p(X_n \mid X_n', G)] -$$
$$\left. KL(q_\phi(X_n' \mid X_n)\|p(X_n'))] \right\} - KL(q(G)\|p(G))$$

$$\text{Loss}_{DM} = \sum_n \sum_i KL\left(p(Z_{n,j} \mid V_{n,j})\|p\left(X_{n,j}' \mid X_{n,j}\right)\right) \tag{9}$$

$$\text{Loss}_{SP} = \sum_n \left\{ \mathbb{E}_{q_\phi(X_n|X_n')q(G)}[\log p(X_n \mid X_n', G)] - KL(q_\phi(Z_n \mid V_n)\|p(Z_n))\right\} \tag{10}$$

$$\text{Loss}_A = \sum_n \equiv tr[(I + \alpha G \odot G)^m] - m = 0 \tag{11}$$

$$\mathcal{L} = ELBO + \lambda_{DM}\text{Loss}_{DM} + \lambda_{SP}\text{Loss}_{SP} + \lambda_A\text{Loss}_A \tag{12}$$

There are three major terms in the ELBO objective which are further decomposed based on source of data. Equation 8 looks at the decomposed ELBO formulation with five terms. The first term is a likelihood clause that ensures that G and Z are learned such that likelihood of observing the simulated data "V" 112 is maximized in the ELBO objective. This is the likelihood cost on the simulated data while the third term is the likelihood cost on the real data.

The second term is a complexity clause that ensures that a posterior density distribution is learned for the latent representation of the simulated data "V" 112 such that it is similar to the prior defined for the hidden embedding Z 208. Similarly, the fourth term is the complexity cost for the real data ensuring the learned representations are parsimonious like the prior defined for the real dataset. The fifth term ensures that the posterior distribution learned for the GNN "G" 210 is similar to the prior defined for it. In this framework, p(Z) is a Gaussian prior and p(G) is a Bernoulli prior. VISL evaluated the existence of edges and orientation only. Instead, the strength of the edges can also be measured as a function of the probability of the existence of the edges. For that, a Concrete prior is defined.

During the training, graph neural network 210 is learned. Based on the learned representation of the graph neural network 210, the backward message propagation for j→i, $h_{j\rightarrow i}$ allows imputation of values where they are missing.

$Loss_{DM}$: To improve the learned representations on the simulated data, the conditional distribution matching loss term in Equation 9 is introduced. For the common or overlapping physical processes between the simulated and the real data, feedback can be provided to the learned representations of the simulated data from the real data. Equation 9 shows that using the learned posterior on the real data as reference, minimizes the KL divergence between the simulated data posterior and the real data posterior for the overlapping variables.

$Loss_{SP}$: Because learning better representation for soil carbon is the primary downstream task, the supervision loss is used place a greater penalty on those reconstructions that lead to higher error in soil carbon prediction.

$Loss_A$: Similar to the DAG-GNN framework, there is a soft constraint on acyclicity of the graph.

The loss term L enables better learning of causal graph structure on the observed data and better representations on the simulated data simultaneously. Since there may be missing entries in the real data, there is more learning on the training examples with the observed data. Therefore, this technique also introduces a mask based on which samples are not missing. The KGRCL framework with the loss formulation are mentioned in algorithm 1 below.

Algorithm 1 Knowledge-Guided Representation learning and Causal structure Learning
Input: Simulated Data $V \in \mathbb{R}^{N \times d}$, Real Data $X \in \mathbb{R}^{N \times p}$
Output: Learned representations $\hat{X}$, $\hat{V}$ and causal graph G
  1 for batch x and vdo
  2 Encode x and z such that $$x' \sim N(\mu_x, \sigma_x^2) \text{ and } z \sim N(\mu_v, \sigma_v^2)$$

Figure 3:
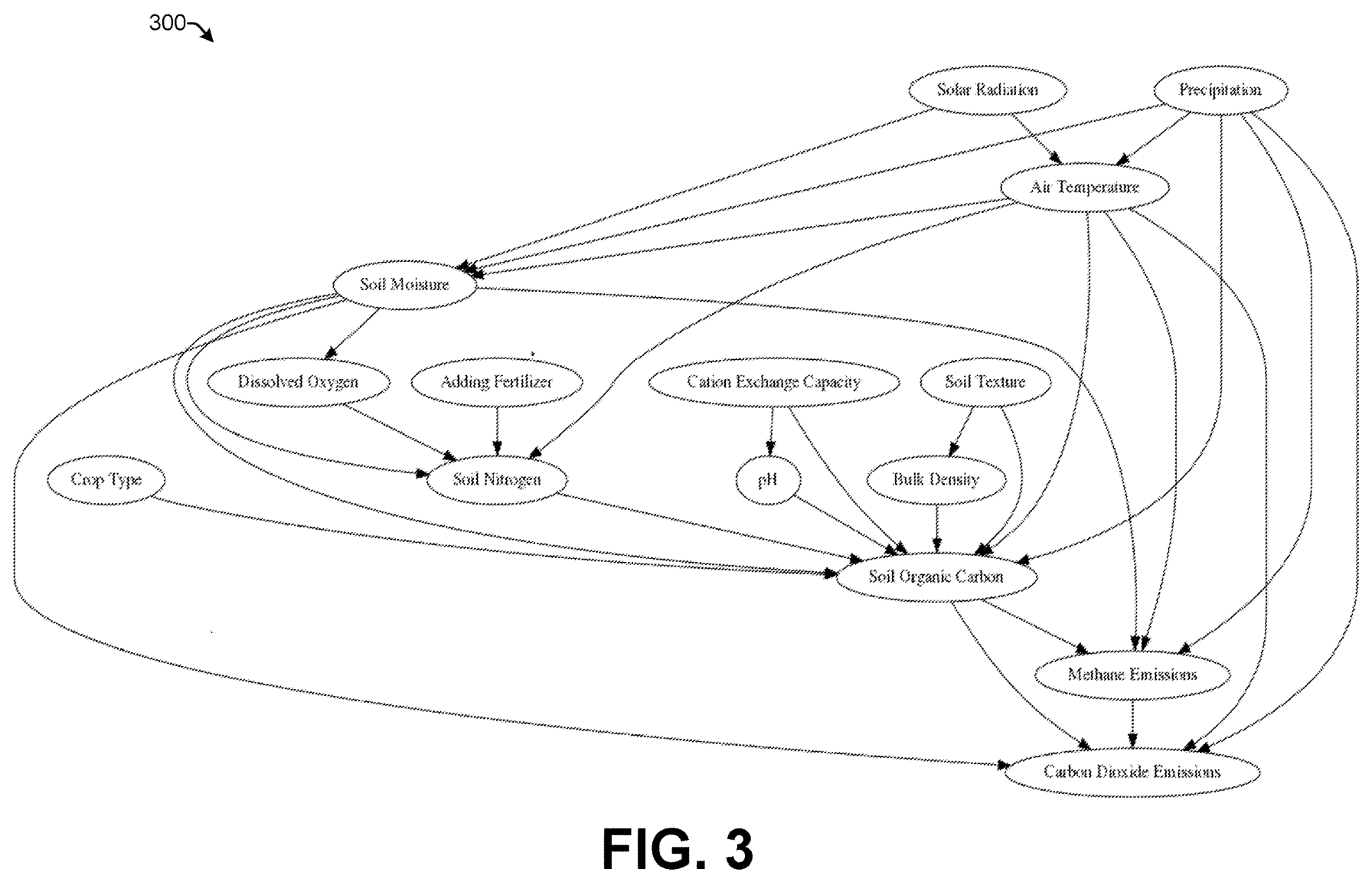

3 Sample G from p(G) and decode $\hat{x}$, $\hat{v}$=R(x', z, G)
  4 Compute the loss as Eq 12
  5 Compute gradients and update parameters in encoders, decoder, and graph G
  6 end FIG. 3 is an illustrative causal graph 300 showing ground truth relationships between five variables. For the sake of simplicity, the causal graph 300 is simplified but in actual practice may include many tens or hundreds of nodes representing measurable features that can be used for predicting soil carbon. Although not shown on this causal graph 300, strengths of relationships between features may also be identified and quantified.

Using the techniques of this disclosure, strong relationships have been identified between several variables and soil temperature. The strengths of the relationships are measured using Average Treatment Effect (ATE). ATE represents the average causal effect of a treatment variable (T) on an outcome variable (O). A positive ATE value indicates that a unit change in treatment causes an increase in outcome. A negative ATE indicates that a unit change in treatment causes a decrease in outcome. The outcome is $f_i(T_i)$ and the potential outcome is $f_i(T)$. From that Individual Treatment Effect is calculated by $f_i(T+1)-f_i(T)$ and $$ATE = \sum_i \frac{ITE_i}{N}.$$

The amount of manure applied in the last year is strongly related to soil temperature (more manure decreases soil temperature with ATE of −30.00). The amount of zinc is strongly related to soil temperature (higher levels of zinc lead to higher soil temperature with ATE of 50.46). The amount of fertilizer applied in the last six months strongly relates to soil temperature (more fertilizer leads to higher soil temperatures with ATE of 62.73).

Figure 4:
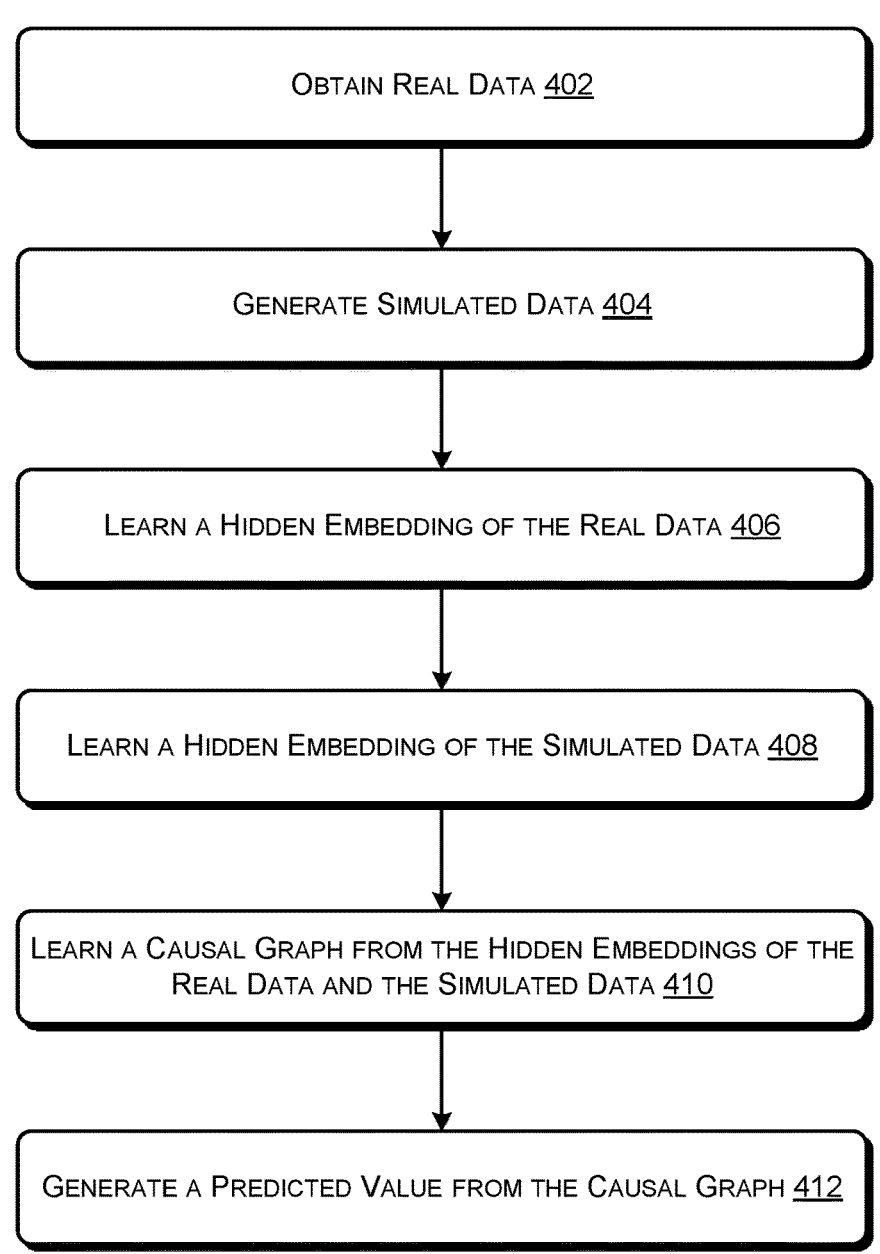
FIG. 4 is a flowchart of a method for learning a causal graph from real data and simulated data.

FIG. 4 is a flow diagram of an illustrative method 400 for learning a causal graph and generating a predicted value from the causal graph. Method 400 may be implemented using the architecture shown in FIG. 2. In one specific implementation, method 400 is used in the context of predicting soil carbon. However, it is also applicable to other contexts.

At operation 402, real data is obtained. The real data is any type of measured or observed data. For "what-if" scenarios the real data can be prospective data including data representing planned interventions or activities. The real data may be obtained directly from sensors, from one or more data stores, or by user entry.

In one implementation, the real data is data from an agricultural plot. The data from the agricultural plot may include soil data, weather data, and field management practice data. Field management practice data indicates the types of manipulations or interventions that have been or will be performed on the agricultural plot. Examples of soil data include soil moisture, soil temperature, soil pH, air temperature, wind velocity, greenhouse gasses, solar radiation, sand content, clay content, soil organic matter, and the amounts of minerals present. Examples of field management practice data include data indicating the performance of an activity (e.g., binary data) or the extent of an activity (e.g., amount or frequency) for activities including, but not limited to, spreading manure, applying fertilizer, mowing, applying pesticide, or picking up silage.

At operation 404, simulated data is generated. The simulated data is generated by one or more simulators. The simulators may be implemented as process-based models that generate values for processes based on inputs. The inputs may be, in whole or part, the real data. In one implementation, the one or more simulators model soil processes for the same agricultural plot from which the real data was obtained. The simulated data may represent any of the same processes captured in the real data and it may also include processes that are not part of the real data. In one implementation, a single data sample or data point includes real data and simulated data representing a shared time point. The shared time point represents a temporal alignment of the real data and the simulated data. The scale of the time points may be an hour, day, week, month, year, or any other length of time.

At operation 406, a hidden embedding of the real data is learned. The hidden embedding, or latent encoding, of the real data is learned from a neural network. In one implementation, the neural network is a multilayer perceptron. Learning the hidden embedding includes learning a data distribution for the real data. The hidden embedding of the real data may be learned using an encoder network and the neural network is the encoder network.

At operation 408, a hidden embedding of the simulated data is learned. The hidden embedding, or latent encoding, of the simulated data is learned from a neural network. In one implementation, the neural network is a multilayer perceptron. Learning the hidden embedding includes learning a data distribution for the simulated data. The hidden embedding of the simulated data may be learned using an encoder network and the neural network is the encoder network.

At operation 410, a causal graph is learned from the hidden embeddings of the real data and the simulated data. The causal graph may be learned such that the likelihood of observing the real data in the causal graph is maximized. Learning the causal graph may include, in one implementation, passing the hidden embedding of the real data and the hidden embedding of the simulated data through respective multilayer perceptrons to the causal graph. This is then followed by iteratively revising the hidden embeddings and the causal graph to learn the causal graph. The iterative revision may include node-to-message passing and message-to-node passing. In one implementation, the neural networks, the hidden embeddings, and the causal graph form a variational auto-encoder based framework. The causal graph may be an encoder network and, in some implementations, the causal graph is a directed acyclic graph (DAG).

At operation 412, a predicted value is generated from the causal graph. The predicted value may be generated by passing the output of the causal graph through a multilayer perceptron layer to create a final feature vector. In one implementation, the final feature vector may represent a predicted value for soil carbon. The final feature vector may represent an observation that is generated by decoding the hidden embeddings of the real data and of the simulated data.

Method 400 may be repeated with a change to the real data to perform a "what-if" comparison. For example, the field management practice data may be modified such as to compare tilling vs. no tilling. Alternatively, the weather data may be modified to see how a changed climate could affect soil carbon. With different values for part of the real data (e.g., field management practices or weather), a second predicted value (e.g., soil carbon) is generated. The change in the real data may, but does not necessarily, result in a different predicted value. If there is no change, then the model can be interpreted as indicating that the change will not affect soil carbon. If there is a change, then two (or more) different conditions as represented by the original real data and modified real data can be compared to see which leads to the best predicted value. For example, multiple field management practices can be compared to see how they affect the predicted value for soil carbon. From that, one of the field management practices can be selected and implemented. Thus, the model may be used to test various field management practices and identify the one that maximizes soil carbon.

Figure 5:
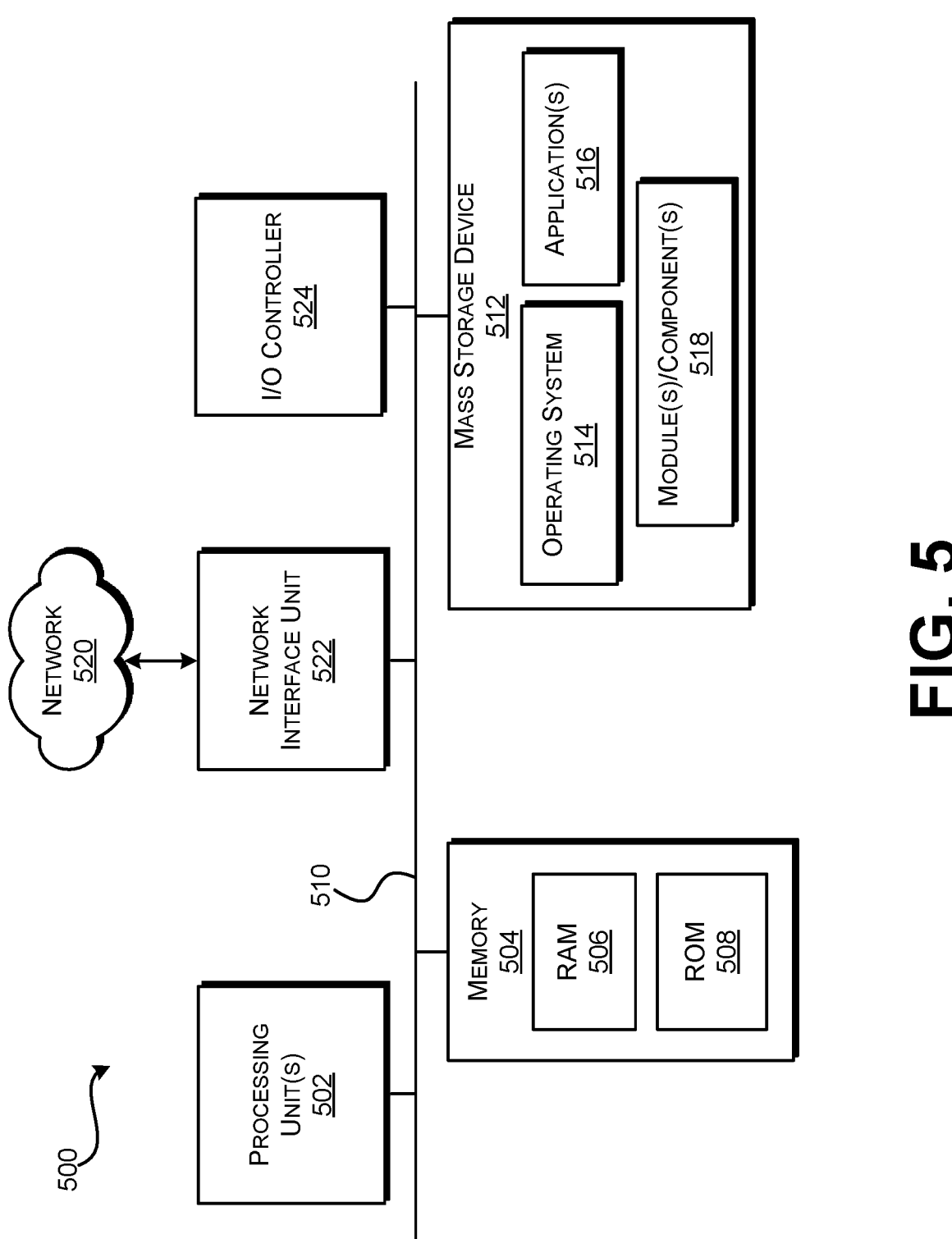
FIG. 5 is a computer architecture diagram illustrating an illustrative computer hardware and software architecture for a computing system capable of implementing aspects of the techniques and technologies presented herein.

FIG. 5 shows details of an example computer architecture 500 for a device, such as a computer or a server configured as part of the cloud-based platform, capable of executing computer instructions (e.g., a module or a component described herein). For example, the device may be the computing device 116 shown in FIG. 1. The computer architecture 500 illustrated in FIG. 5 includes processing unit(s) 502, a system memory 504, including a random-access memory 506 ("RAM") and a read-only memory ("ROM") 508, and a system bus 510 that couples the memory 504 to the processing unit(s) 502. The processing units 502 may also comprise or be part of a processing system. In various examples, the processing units 502 of the processing system are distributed. Stated another way, one processing unit 502 of the processing system may be located in a first location (e.g., a rack within a datacenter) while another processing unit 502 of the processing system is located in a second location separate from the first location.

Processing unit(s), such as processing unit(s) 502, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 500, such as during startup, is stored in the ROM 508. The computer architecture 500 further includes a mass storage device 512 for storing an operating system 514, application(s) 516, modules/components 518, and other data described herein. Examples of data that may be stored in the mass storage device 512 include the real data 106 and the simulated data 112 shown in FIG. 1. Examples of applications 516 include an application configured to implement the framework 200 shown in FIG. 2 as well as one or more of the simulator(s) 114.

The mass storage device 512 is connected to processing unit(s) 502 through a mass storage controller connected to the bus 510. The mass storage device 512 and its associated computer-readable media provide non-volatile storage for the computer architecture 500. Although the description of computer-readable media contained herein refers to a mass storage device, it should be appreciated by those skilled in the art that computer-readable media can be any available computer-readable storage medium or communications medium that can be accessed by the computer architecture 500.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static random-access memory (SRAM), dynamic random-access memory (DRAM), phase-change memory (PCM), ROM, erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network-attached storage, storage area networks, hosted computer storage or any other storage memory, storage device, and/or storage medium that can be used to store and maintain information for access by a computing device.

In contrast to computer-readable storage media, communication media embodies computer-readable instructions, data structures, program modules, or other data in a modulated data signal, such as a carrier wave, or other transmission mechanism. As defined herein, computer-readable storage medium does not include communication medium. That is, computer-readable storage media does not include communications media and thus excludes media consisting solely of a modulated data signal, a carrier wave, or a propagated signal, per se.

According to various configurations, the computer architecture 500 may operate in a networked environment using logical connections to remote computers through the network 520. The computer architecture 500 may connect to the network 520 through a network interface unit 522 connected to the bus 510. An I/O controller 524 may also be connected to the bus 510 to control communication in input and output devices.

It should be appreciated that the software components described herein may, when loaded into the processing unit(s) 502 and executed, transform the processing unit(s) 502 and the overall computer architecture 500 from a general-purpose computing system into a special-purpose computing system customized to facilitate the functionality presented herein. The processing unit(s) 502 may be constructed from any number of transistors or other discrete circuit elements, which may individually or collectively assume any number of states. More specifically, the processing unit(s) 502 may operate as a finite-state machine, in response to executable instructions contained within the software modules disclosed herein. These computer-executable instructions may transform the processing unit(s) 502 by specifying how the processing unit(s) 502 transitions between states, thereby transforming the transistors or other discrete hardware elements constituting the processing unit(s) 502.

Figure 6:
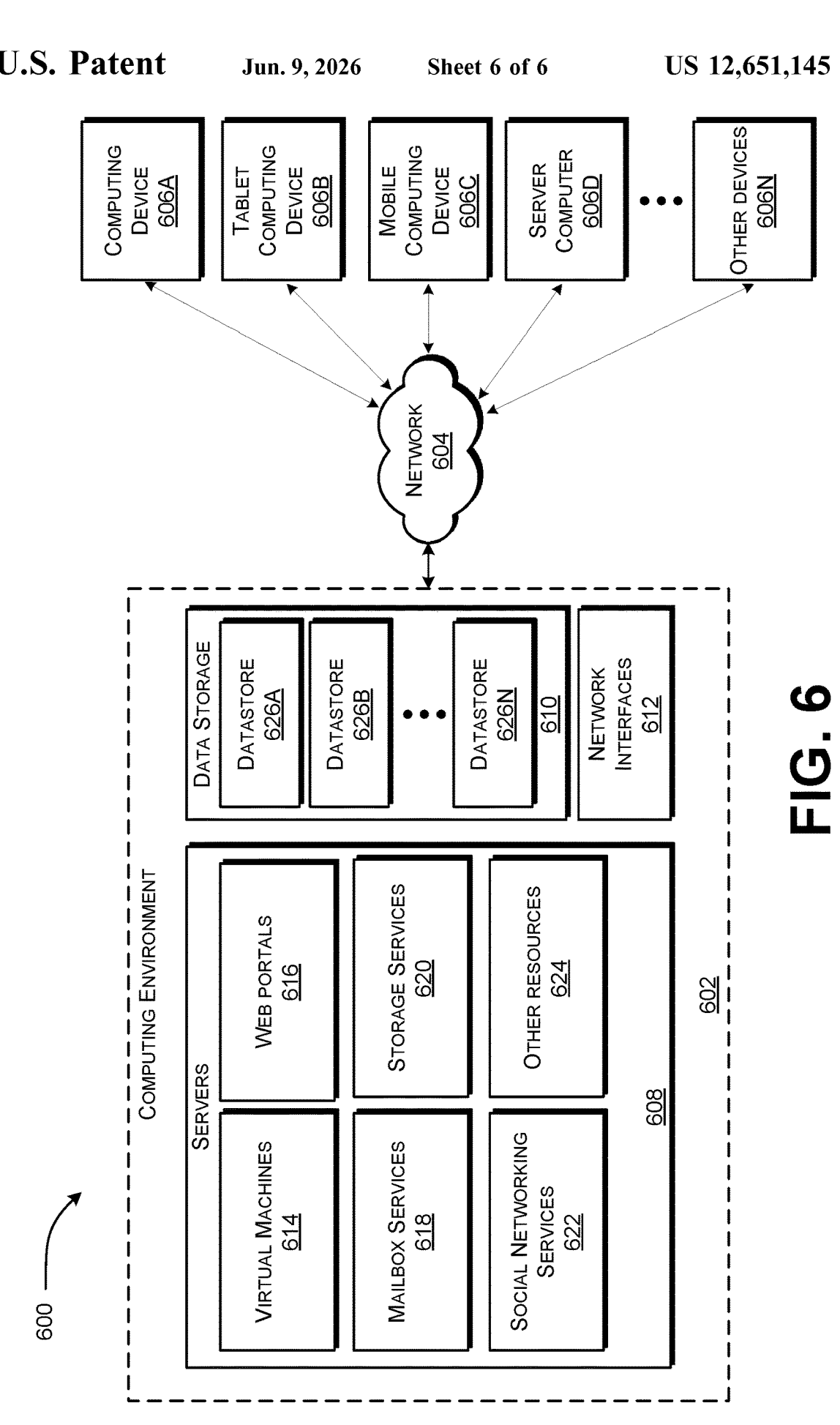
FIG. 6 is a diagram illustrating a distributed computing environment capable of implementing aspects of the techniques and technologies presented herein.

FIG. 6 depicts an illustrative distributed computing environment 600 capable of executing the components described herein. Thus, the distributed computing environment 600 illustrated in FIG. 6 can be utilized to execute any aspects of the components presented herein.

Accordingly, the distributed computing environment 600 can include a computing environment 602 operating on, in communication with, or as part of the network 604. The network 604 can include various access networks. One or more client devices 606A-606N (hereinafter referred to collectively and/or generically as "clients 606" and also referred to herein as computing devices 606) can communicate with the computing environment 602 via the network 604. In one illustrated configuration, the clients 606 include a computing device 606A such as a laptop computer, a desktop computer, or other computing device; a slate or tablet computing device ("tablet computing device") 606B; a mobile computing device 606C such as a mobile telephone, a smart phone, or other mobile computing device; a server computer 606D; and/or other devices 606N. It should be understood that any number of clients 606 can communicate with the computing environment 602.

In various examples, the computing environment 602 includes servers 608, data storage 610, and one or more network interfaces 612. The servers 608 can host various services, virtual machines, portals, and/or other resources. In the illustrated configuration, the servers 608 host virtual machines 614, Web portals 616, mailbox services 618, storage services 620, and/or, social networking services 622. As shown in FIG. 6, the servers 608 also can host other services, applications, portals, and/or other resources ("other resources") 624.

As mentioned above, the computing environment 602 can include the data storage 610. According to various implementations, the functionality of the data storage 610 is provided by one or more databases operating on, or in communication with, the network 604. The functionality of the data storage 610 also can be provided by one or more servers configured to host data for the computing environment 600. The data storage 610 can include, host, or provide one or more real or virtual datastores 626A-626N (hereinafter referred to collectively and/or generically as "datastores 626"). The datastores 626 are configured to host data used or created by the servers 608 and/or other data. That is, the datastores 626 also can host or store web page documents, word documents, presentation documents, data structures, algorithms for execution by a recommendation engine, and/or other data utilized by any application program. Aspects of the datastores 626 may be associated with a service for storing files.

The computing environment 602 can communicate with, or be accessed by, the network interfaces 612. The network interfaces 612 can include various types of network hardware and software for supporting communications between two or more computing devices including the computing devices and the servers. It should be appreciated that the network interfaces 612 also may be utilized to connect to other types of networks and/or computer systems.

It should be understood that the distributed computing environment 600 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 600 provides the software functionality described herein as a service to the computing devices. It should be understood that the computing devices can include real or virtual machines including server computers, web servers, personal computers, mobile computing devices, smart phones, and/or other devices. As such, various configurations of the concepts and technologies disclosed herein enable any device configured to access the distributed computing environment 600 to utilize the functionality described herein for providing the techniques disclosed herein, among other aspects.

Illustrative Embodiments

The following clauses described multiple possible embodiments for implementing the features described in this disclosure. The various embodiments described herein are not limiting nor is every feature from any given embodiment required to be present in another embodiment. Any two or more of the embodiments may be combined together unless context clearly indicates otherwise. As used herein in this document "or" means and/or. For example, "A or B" means A without B, B without A, or A and B. As used herein, "comprising" means including all listed features and potentially including addition of other features that are not listed. "Consisting essentially of" means including the listed features and those additional features that do not materially affect the basic and novel characteristics of the listed features. "Consisting of" means only the listed features to the exclusion of any feature not listed.

Clause 1. This clause covers the training of a model. A computer-implemented method of learning a causal graph (102) from a combination of real data (106) and simulated data (112) comprising: obtaining the real data; generating the simulated data with one or more simulators (114); learning a first hidden embedding (206) of the real data using a first neural network (202); learning a second hidden embedding (208) of the simulated data using a second neural network (204); passing the first hidden embedding through a first multilayer perceptron to the causal graph (210); passing the second hidden embedding through a second multilayer perceptron to the causal graph; and iteratively revising the first hidden embedding, the second hidden embedding, and the causal graph thereby learning the causal graph.

Clause 2. The method of clause 1, wherein the real data comprises soil data from an agricultural plot (104) and the simulated data comprises output from the one or more simulators modeling soil processes for the agricultural plot.

Clause 3. The method of any of clauses 1 or 2, wherein a single data sample includes the real data and the simulated data representing a shared timepoint.

Clause 4. The method of any of clauses 1 to 3, wherein learning the first hidden embedding comprises learning a first data distribution for the real data and learning the second hidden embedding comprises learning a second data distribution for the simulated data.

Clause 5. The method of any of clauses 1 to 4, wherein the causal graph is learned such that the likelihood of observing the real data in the causal graph is maximized.

Clause 6. The method of any of clauses 1 to 5, wherein the first neural network, the second neural network, the first hidden embedding, the second hidden embedding, and the causal graph form a variational auto-encoder based framework.

Clause 7. The method of any of clauses 1 to 6, wherein iteratively revising the first hidden embedding, the second hidden embedding, and the causal graph comprise node-to-message passing and message-to-node passing.

Clause 8. The method of any of clauses 1 to 7, further comprising decoding the first hidden embedding and the second hidden embedding with the causal graph to generate an observation that is a final feature vector (214).

Clause 9. The method of clause 8, further comprising using the final feature vector as input for a downstream task. (e.g., predict soil carbon level)

Clause 10. Computer-readable storage media encoding instructions that cause a processor to perform the method of any of clauses 1 to 9.

Clause 11. A computing device comprising a processor and memory, the memory containing instructions that cause the processor to perform the method of any of clauses 1 to 9.

Clause 12. A computer-implemented machine learning model for generating predictions from a combination of real data (106) and simulated data (112) comprising: one or more simulators (114) configured to generate the simulated data (112); a dataset comprising the real data (106); a first trained neural network (202) configured to generate a first hidden embedding (206) from the real data; a second trained neural network (204) configured to generate a second hidden embedding (208) from the simulated data; a causal graph (210) learned from the first embedding and the second embedding, wherein the causal graph represents causal relationships between features in the real data and in the simulated data; and a multilayer perceptron (212) configured to generate a final feature vector (214) from the causal graph, the final feature vector representing a predicted value (120).

Clause 13. The machine learning model of clause 12, wherein the one or more simulators are process-based models that generate the simulated data based on the real data.

Clause 14. The machine learning model of clause 12 or 13, wherein the real data comprises soil data for an agricultural plot (104) and the predicted value is a soil carbon level.

Clause 15. The machine learning model of any of clauses 12 to 14, wherein the first trained neural network and the second trained neural network are encoder networks.

Clause 16. The machine learning model of any of clauses 12 to 15, wherein the causal graph is a decoder network.

Clause 17. The machine learning model of any of clauses to 12 to 16, wherein the causal graph is a directed acyclic graph (DAG).

Clause 18. This method describes a use case for prediction of soil carbon and what-if comparisons for field management. A method of predicting soil carbon levels comprising: obtaining real data (106) for an agricultural plot (104), the real data comprising soil data and field management practice data; generating simulated data (112) for the agricultural plot using one or more simulators (114); learning a first hidden embedding (206) of the real data; learning a second hidden embedding (208) of the simulated data; learning a causal graph (210) from the first hidden embedding and the second hidden embedding; and generating, by a multilayer perceptron (212) a predicted value (120) for soil carbon.

Clause 19. The method of clause 18, wherein the real data and the simulated data are aligned by timepoints.

Clause 20. The method of clause 18 or 19, wherein the one or more simulators are process-based models.

Clause 21. The method of any of clause 18 to 20, wherein the first hidden embedding of the real data and the second hidden embedding of the simulated data are learned using decoder networks (202, 204).

Clause 22. The method of any of clauses 18 to 21, wherein the soil data comprises at least one of soil moisture, soil temperature, soil pH, air temperature, wind velocity, greenhouse gasses, solar radiation, sand content, clay content, soil organic matter, the amounts of minerals present, or weather data and the field management practice data comprise data indicating at least one of spreading manure, applying fertilizer, mowing, applying pesticide, or picking up silage.

Clause 23. The method of any of clauses 18 to 22, further comprising: modifying the field management practice data; generating a second predicted value for soil carbon; and selecting a field management practice based on the predicted value for soil carbon and on the second predicted value for soil carbon.

CONCLUSION

While certain example embodiments have been described, including the best mode known to the inventors for carrying out the invention, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. Skilled artisans will know how to employ such variations as appropriate, and the embodiments disclosed herein may be practiced otherwise than specifically described. The accompanying claims and their equivalents are intended to cover such forms or modifications as would fall within the scope and spirit of certain of the inventions disclosed herein.

The terms "a," "an," "the" and similar referents used in the context of describing the invention are to be construed to cover both the singular and the plural unless otherwise indicated herein or clearly contradicted by context. The terms "based on," "based upon," and similar referents are to be construed as meaning "based at least in part" which includes being "based in part" and "based in whole," unless otherwise indicated or clearly contradicted by context. The terms "portion," "part," or similar referents are to be construed as meaning at least a portion or part of the whole including up to the entire noun referenced.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different sensors).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Furthermore, references have been made to publications, patents and/or patent applications throughout this specification. Each of the cited references is individually incorporated herein by reference for its particular cited teachings as well as for all that it discloses.

The invention claimed is:

1. A computer-implemented method of learning a causal graph from a combination of real data and simulated data comprising:

obtaining the real data;

generating the simulated data with one or more simulators;

learning a first hidden embedding of the real data using a first neural network;

learning a second hidden embedding of the simulated data using a second neural network;

iteratively revising the first hidden embedding, the second hidden embedding, and the causal graph, wherein the iteratively revising comprises passing the first hidden embedding learned from the first neural network to the causal graph and the second hidden embedding learned from the second neural network to the causal graph; and learning the causal graph through the iterative revisions.

2. The method of claim 1, wherein the real data comprises soil data from an agricultural plot and the simulated data comprises output from the one or more simulators modeling soil processes for the agricultural plot.

3. The method of claim 1, wherein a single data sample includes the real data and the simulated data representing a shared timepoint.

4. The method of claim 3, wherein the real data and the simulated data are time series data observed at different cadences, and the shared timepoint comprises temporally aligning the real data and the simulated data by time-based indexing of samples.

5. The method of claim 1, wherein learning the first hidden embedding comprises learning a first data distribution for the real data and learning the second hidden embedding comprises learning a second data distribution for the simulated data.

6. The method of claim 1, wherein the causal graph is learned such that the likelihood of observing the real data in the causal graph is maximized.

7. The method of claim 1, wherein the first neural network, the second neural network, the first hidden embedding, the second hidden embedding, and the causal graph form a variational auto-encoder based framework.

8. The method of claim 1, wherein iteratively revising the first hidden embedding, the second hidden embedding, and the causal graph comprise node-to-message passing and message-to-node passing.

9. The method of claim 1, further comprising decoding the first hidden embedding and the second hidden embedding with the causal graph to generate an observation that is a final feature vector.

10. A computer-implemented machine learning model for generating predictions from a combination of real data and simulated data comprising:

one or more simulators configured to generate the simulated data;

a dataset comprising the real data;

a first trained neural network configured to generate a first hidden embedding from the real data;

a second trained neural network configured to generate a second hidden embedding from the simulated data;

a causal graph iteratively learned from iterative revisions to the first hidden embedding and the second hidden embedding, wherein the causal graph represents causal relationships between features in the real data and in the simulated data; and a multilayer perceptron configured to generate a final feature vector from the causal graph, the final feature vector representing a predicted value.

11. The machine learning model of claim 10, wherein the one or more simulators are process-based models that generate the simulated data based on the real data.

12. The machine learning model of claim 10, wherein the first trained neural network and the second trained neural network are encoder networks.

13. The machine learning model of claim 10, wherein the causal graph is a decoder network.

14. The machine learning model of claim 10, wherein the causal graph is learned by transforming features of the first hidden embedding using distributional parameters from the second hidden embedding for overlapping features between the real data and the simulated data.

15. The machine learning model of claim 10, wherein the causal graph includes nodes representing at least one variable present in the simulated data but not present in the real data, and at least one variable present in the real data but not in the simulated data.

16. A method of predicting soil carbon levels comprising:

obtaining real data for an agricultural plot, the real data comprising soil data and field management practice data;

generating simulated data for the agricultural plot using one or more simulators;

learning a first hidden embedding of the real data from a first neural network, wherein learning the first hidden embedding comprises learning a first data distribution for the real data;

learning a second hidden embedding of the simulated data from a second neural network, wherein learning the second hidden embedding comprises learning a second data distribution for the simulated data;

learning a causal graph based on iterative revisions to the first hidden embedding and the second hidden embedding, wherein the causal graph is updated during the iterative revisions; and generating, by a multilayer perceptron a predicted value for soil carbon.

17. The method of claim 16, wherein the real data and the simulated data are aligned by time points, wherein a scale of the time points is a day.

18. The method of claim 16, wherein the one or more simulators are process-based models.

19. The method of claim 16, wherein the first hidden embedding of the real data and the second hidden embedding of the simulated data are learned using decoder networks.

20. The method of claim 16, further comprising:

modifying the field management practice data;

generating a second predicted value for soil carbon; and selecting a field management practice based on the predicted value for soil carbon and on the second predicted value for soil carbon.

* * * * *